(12) United States Patent
Yabata

(10) Patent No.: US 10,085,170 B2
(45) Date of Patent: Sep. 25, 2018

(54) COMMUNICATION APPARATUS

(71) Applicant: Alps Electric Co., Ltd., Ota-ku, Tokyo (JP)

(72) Inventor: Tetsuya Yabata, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/617,611

(22) Filed: Jun. 8, 2017

(65) Prior Publication Data
US 2018/0014220 A1    Jan. 11, 2018

(30) Foreign Application Priority Data
Jul. 6, 2016    (JP) ................ 2016-134304

(51) Int. Cl.
| H04B 7/00 | (2006.01) |
| H04W 28/02 | (2009.01) |
| H04W 48/18 | (2009.01) |
| H04W 28/10 | (2009.01) |
| H04W 28/16 | (2009.01) |

(Continued)

(52) U.S. Cl.
CPC ..... H04W 28/021 (2013.01); H04W 28/0215 (2013.01); H04W 28/10 (2013.01); H04W 48/18 (2013.01); H04W 28/16 (2013.01); H04W 84/18 (2013.01); H04W 88/06 (2013.01)

(58) Field of Classification Search
CPC .......... H04W 28/021; H04W 28/0215; H04W 28/10; H04W 84/18; H04W 88/06
USPC ... 455/41.1, 41.2, 90.2, 414.4, 552.1, 569.1, 455/575.2, 518, 434, 556.1; 370/332, 370/338, 329, 350, 328, 252; 704/201
See application file for complete search history.

(56) References Cited

U.S. PATENT DOCUMENTS

| 7,215,659 B1 * | 5/2007 | Chen ............... H04W 16/14 370/338 |
| 8,134,949 B2 * | 3/2012 | Ruuska ............. H04L 12/66 370/328 |

(Continued)

FOREIGN PATENT DOCUMENTS

| EP | 1089578 A2 | 9/2000 |
| GB | 2394865 A | 5/2004 |

(Continued)

OTHER PUBLICATIONS

European Search Report from European Application No. 17179580 dated Nov. 13, 2017.

*Primary Examiner* — Tan H Trinh
(74) *Attorney, Agent, or Firm* — Bayer Law Group LLP

(57) ABSTRACT

A first distant apparatus performs communication of streaming data and other data for which a change in data transfer rate is required to be suppressed, and a second distant apparatus performs communication of phone book data and other data for which a change in data transfer rate is permitted. When communication with the first distant apparatus and communication with the second distant apparatus are concurrently performed, a first communication unit is selected for communication with the first distant apparatus and a second communication unit, which is faster than the first communication unit, is selected for communication with the second distant apparatus. Thus, it is possible to make a collision in communication less likely to occur, and to maintain the communication quality of the first type of data.

14 Claims, 9 Drawing Sheets

(51) Int. Cl.
*H04W 88/06* (2009.01)
*H04W 84/18* (2009.01)

(56) References Cited

U.S. PATENT DOCUMENTS

| | | | |
|---|---|---|---|
| 8,521,225 B2* | 8/2013 | Takahashi | H04W 72/048 455/41.2 |
| 2002/0136183 A1* | 9/2002 | Chen | H04W 72/1215 370/338 |
| 2004/0209569 A1* | 10/2004 | Heinonen | H04M 1/6066 455/41.2 |
| 2006/0046653 A1* | 3/2006 | Kirbas | H04M 1/0235 455/41.2 |
| 2006/0209763 A1* | 9/2006 | Emeott | H04L 1/0002 370/332 |
| 2007/0015525 A1* | 1/2007 | Beming | H04L 47/15 455/509 |
| 2007/0076626 A1* | 4/2007 | Wise | H04L 1/1825 370/252 |
| 2007/0238475 A1* | 10/2007 | Goedken | H04M 1/7253 455/512 |
| 2008/0125189 A1 | 5/2008 | Tomoda | |
| 2009/0161602 A1* | 6/2009 | Matsumoto | H04W 72/1242 370/328 |
| 2009/0227282 A1* | 9/2009 | Miyabayashi | H04L 63/0492 455/552.1 |
| 2009/0245126 A1* | 10/2009 | Kitani | H04L 47/10 370/252 |
| 2010/0061326 A1* | 3/2010 | Lee | H04W 88/06 370/329 |
| 2011/0010166 A1* | 1/2011 | Izukawa | H04M 1/006 704/201 |
| 2011/0019579 A1* | 1/2011 | Pauly | H04L 1/0001 370/252 |
| 2011/0052072 A1* | 3/2011 | Lee | H04M 1/7253 382/190 |
| 2011/0116490 A1* | 5/2011 | Wilhelmsson | H04W 16/14 370/343 |
| 2012/0281558 A1* | 11/2012 | Anderson | H04W 48/18 370/252 |
| 2012/0307702 A1* | 12/2012 | Nakae | H04W 48/12 370/311 |
| 2014/0188348 A1* | 7/2014 | Gautama | B60W 10/30 701/48 |
| 2014/0213185 A1* | 7/2014 | Arponen | H04B 5/0031 455/41.1 |
| 2014/0215491 A1* | 7/2014 | Addepalli | H04W 4/046 719/313 |
| 2014/0269666 A1* | 9/2014 | Marsh | H04W 56/00 370/350 |
| 2015/0244810 A1* | 8/2015 | Takatsuka | H04W 76/022 709/228 |
| 2015/0245298 A1* | 8/2015 | Takahashi | H04W 52/0254 455/574 |
| 2015/0351022 A1* | 12/2015 | Sakoda | H04W 48/18 370/329 |
| 2016/0029190 A1* | 1/2016 | Rattner | G06F 17/28 455/414.4 |
| 2016/0191093 A1 | 6/2016 | Larsen | |
| 2017/0019759 A1* | 1/2017 | Kikuchi | H04W 4/02 |
| 2017/0289896 A1* | 10/2017 | Onishi | H04W 76/14 |
| 2017/0295284 A1* | 10/2017 | Song | H04M 11/007 |

FOREIGN PATENT DOCUMENTS

| | | |
|---|---|---|
| GB | 2476564 A | 6/2011 |
| JP | 2006-25112 | 1/2006 |
| JP | 2006-352522 | 12/2006 |
| WO | 2008/054985 A2 | 5/2008 |
| WO | 2010/148100 A1 | 12/2010 |

* cited by examiner

COMMUNICATION APPARATUS

CLAIM OF PRIORITY

This application claims benefit of Japanese Patent Application No. 2016-134304 filed on Jul. 6, 2016, which is hereby incorporated by reference.

BACKGROUND OF THE INVENTION

1. Field of the Invention

The present invention relates to a communication apparatus that can concurrently communicate with a plurality of distant apparatuses in compliance with, for example, Bluetooth (registered trademark).

2. Description of the Related Art

If a plurality of communications are concurrently performed, a collision may occur in communications. If collisions frequently occur in communications, data is repeatedly retransmitted in relevant communications, leading to a congested state, in which a throughput is extremely lowered. To avoid a congested state, a wireless communication apparatus described in Japanese Unexamined Patent Application Publication No. 2008-136134 uses a low-speed communication means when the communication network is congested and uses a high-speed communication means when the communication network is not congested. Other examples of related art are described in Japanese Unexamined Patent Application Publication Nos. 2015-180043, 2006-352522, and 2006-25112.

SUMMARY OF THE INVENTION

In communication in compliance with, for example, Bluetooth (registered trademark) (Bluetooth may be abbreviated below as BT), frequency hopping spread spectrum (FHSS) is used in which communication is performed while 79 frequency channels in the 2.4-GHz band are switched at pseudo-random. A frequency channel switchover (frequency hopping) is made at intervals of 625 μs, each interval being called a slot. In BT communication, a relatively small network called a piconet is used for master-slave communication. A piconet is composed of one master and up to seven slaves. The master manages the timings of periods (slots) during which frequency channels are switched, frequency hopping patterns, and the like. Each slave communicates with the master in response to a polling signal from the master. Within the piconet, communication is performed only between the master and the slaves and is not performed directly between slaves.

When one communication apparatus belongs to a plurality of piconets, a plurality of overlapping piconets form a network called a scatternet. Specifically, when a communication apparatus that is belonging to a piconet as the master or a slave further belongs to another piconet as a slave, a scatternet is formed. One communication apparatus cannot function as masters for a plurality of piconets.

When a scatternet is formed in BT communication, a communication apparatus belonging to a plurality of piconets cannot grasp a timing at which a packet is transmitted from the master of each piconet to which the communication apparatus belongs as a slave, so the communication apparatus cannot adjust the timing. Timings of slots are independent for each piconet and are not synchronized among piconets. Therefore, a packet transmitted from the master of one piconet may collide with a packet to be switched on another piconet and these packets may be lost.

If, a packet collision occurs, for example, while voice data is transmitted during a call in Synchronous Connection-Oriented (SCO) communication, which is one type of line-switched communication, data is lost due to a packet loss, causing a sound skip. In Asynchronous Connection-Less (ACL) communication, which is one type of store and forward communication, a packet collision caused during data transmission involves packet retransmission, lowering the data transfer rate. If the data is audio data used to reproduce music, a reduction in the data transfer rate may cause a sound skip.

A possible solution to a packet collision in a scatternet is to use a low-speed communication means as used in the wireless communication apparatus described in Japanese Unexamined Patent Application Publication No. 2008-136134 above. However, when a low-speed communication means is used for voice data during a call or audio data used to reproduce music, if the data transfer rate is greatly reduced, a sound skip may occur. Even if data is such that a change in the data transfer rate is permitted to a certain extent, the use of a low-speed communication means is disadvantageous in that it will take a long time to transfer data.

The present invention addresses the above situation by providing a communication apparatus that can make a collision less likely to occur during communication with different distant apparatuses when communication is concurrently performed with a plurality of distant apparatuses, while maintaining communication quality for data for which a change in data communication rate is required to be suppressed.

A communication apparatus in the present invention is a communication apparatus that can concurrently communicate with a plurality of distant apparatuses. The communication apparatus includes a first communication unit that communicates in a first communication method, a second communication unit that communicates in a second communication method in which communication speed is higher compared with the first communication method, and a selecting unit that selects, for each of the plurality of distant apparatuses, any one of the first communication unit and second communication unit as a communication unit to be used for communication. The plurality of distant apparatuses includes a first distant apparatus that performs communication of a first type of data for which a change in data transfer rate is required to be suppressed and a second distant apparatus that performs communication of a second type of data for which a change in data transfer rate is permitted. When the communication apparatus concurrently communicates with at least one first distant apparatus and at least one second distant apparatus, the selecting unit selects the first communication unit for communication with the first distant apparatus and selects the second communication unit for communication with the second distant apparatus.

In this structure, in the case in which communication with the first distant apparatus and communication with the second distant apparatus are concurrently performed, the first communication unit is selected for communication with the first distant apparatus and the second communication unit, which is faster than the first communication unit, is selected for communication with the second distant apparatus. Thus, communication time is shortened for the second type of data. Therefore, it is possible to make a collision in communication less likely to occur. On the other hand, the communication speed of the first type of data is low, and so, it is easy to suppress a change in data transfer rate. Therefore, it is possible to maintain the communication quality of the first type of data. Furthermore, since the communication speed of the second type of data is raised, time taken to transfer the second type of data is shortened.

Preferably, more power is consumed in the second communication method than in the first communication method. In the case in which communication with the first distant apparatus and communication with the second distant apparatus are not concurrently performed, the selecting unit preferably selects the first communication unit for communication with all distant apparatuses that can communicate in the first communication method.

In this structure, in the case in which communication with the first distant apparatus and communication with the second distant apparatus are not concurrently performed, the first communication unit that consumes less power than the second communication unit is used to communicate with all distant apparatuses that can communicate in the first communication method, an increase in power consumption can be suppressed.

The communication apparatus preferably has a communication control unit that performs flow control in communication with the distant apparatus. In the case in which communication with the first distant apparatus and communication with the second distant apparatus are concurrently performed, in flow control in communication with the second distant apparatus, the communication control unit inserts a delay before transmitting, to the second distant apparatus, a signal that permits transmission to the communication apparatus.

In this structure, in flow control in communication with the second distant apparatus, a timing at which to permit the second distant apparatus to transmit to the communication apparatus is delayed. Therefore, a time interval between transmissions from the second distant apparatus to the communication apparatus is prolonged, and an overlap becomes less likely to occur between the period of transmission from the second distant apparatus and the period of transmission from another distant apparatus. Accordingly, a collision in communication becomes less likely to occur.

When a state in which communication with the first distant apparatus and communication with the second distant apparatus are concurrently performed is canceled, the communication control unit preferably stops the insertion of the delay, which would otherwise be inserted before the signal that permits transmission to the communication apparatus is transmitted to the second distant apparatus.

In this structure, since the insertion of the delay is stopped, the second distant apparatus is permitted to transmit to the communication apparatus at an early timing and a time interval between transmissions from the second distant apparatus to the communication apparatus is shortened. Therefore, the rate at which data is transferred from the second distant apparatus is raised.

In the case in which communication with the first distant apparatus and communication with the second distant apparatus are concurrently performed, the communication control unit preferably transmits, to the second distant apparatus, a signal that specifies a minimum value as the number of packets, in the flow control, that are permitted to be transmitted in succession from the second distant apparatus.

In this structure, in flow control in communication with the second distant apparatus, the number of packets transmitted in succession from the second distant apparatus is minimized. Therefore, a temporary stop in transmission from the second distant apparatus due to flow control is likely to occur, and the frequency of transmission from the second distant apparatus is thereby lowered. Therefore, an overlap is less likely to occur between the period of transmission from the second distant apparatus and the period of transmission from another distant apparatus. Therefore, a collision in communication becomes less likely to occur.

The flow control is preferably flow control based on a credit. The number of packets, in the flow control, that are permitted to be transmitted in succession from the distant apparatus preferably corresponds to the credit. In the case in which communication with the first distant apparatus and communication with the second distant apparatus are concurrently performed, the communication control unit preferably transmits a signal that specifies a credit with the minimum value to the second distant apparatus.

In this structure, in flow control in communication with the second distant apparatus, the value of a credit specified for the second distant apparatus is minimized. Therefore, a temporary stop in transmission from the second distant apparatus due to flow control is likely to occur, and the frequency of transmission from the second distant apparatus is thereby lowered. Therefore, an overlap is less likely to occur between the period of transmission from the second distant apparatus and the period of transmission from another distant apparatus. Therefore, a collision in communication becomes less likely to occur.

When a state in which communication with the first distant apparatus and communication with the second distant apparatus are concurrently performed is canceled, the communication control unit transmits a signal that specifies a credit larger than the credit with the minimum value to the second distant apparatus for which the credit with the minimum value had been specified before the state has been canceled.

In this structure, since the value of the credit specified for the second distant apparatus becomes larger the minimum value. Therefore, a temporary stop in transmission from the second distant apparatus due to flow control is less likely to occur, and the frequency of transmission from the second distant apparatus is thereby raised. Therefore, the rate at which data is transferred from the second distant apparatus is raised.

The first type of data is preferably streaming data.

In this structure, in the case in which communication with the first distant apparatus and communication with the second distant apparatus are concurrently performed, although the communication speed of the streaming data is low, the communication speed of the second type of data is raised, so the communication quality of the first type of data is maintained. Furthermore, since the streaming data involves a relatively large amount of transfer and thereby takes a long communication period, when the second communication unit is used in communication of the streaming data, an increase in power consumption is suppressed.

The communication apparatus can be preferably connected to a piconet on which one communication apparatus functions as a master that manages timings in communication and other communication apparatuses each function as a slave that communicates with the master. The first distant apparatus and second distant apparatus preferably belong to different piconets.

In this structure, in the case in which the communication apparatus concurrently communicates with the first distant apparatus and second distant apparatus that belong different piconets, a collision in communication becomes less likely to occur.

The communication apparatus is preferably incorporated in a vehicle-mounted electronic device and preferably communicates with the distant apparatus incorporated in a mobile device carried in the vehicle.

In this structure, in the case in which a vehicle-mounted electronic device concurrently communicates with a plurality of mobile devices in the vehicle, a collision in communication becomes less likely to occur.

The first communication method is preferably a communication method based on Bluetooth (BR/EDR), and the second communication method is preferably a communication method based on Bluetooth+HS that uses a wireless LAN.

When communication is concurrently performed with a plurality of distant apparatuses, the present invention can make a collision less likely to occur during communication with different distant apparatuses, while maintaining communication quality for data for which a change in data communication rate is required to be suppressed.

DESCRIPTION OF THE PREFERRED EMBODIMENT

Figure 1:
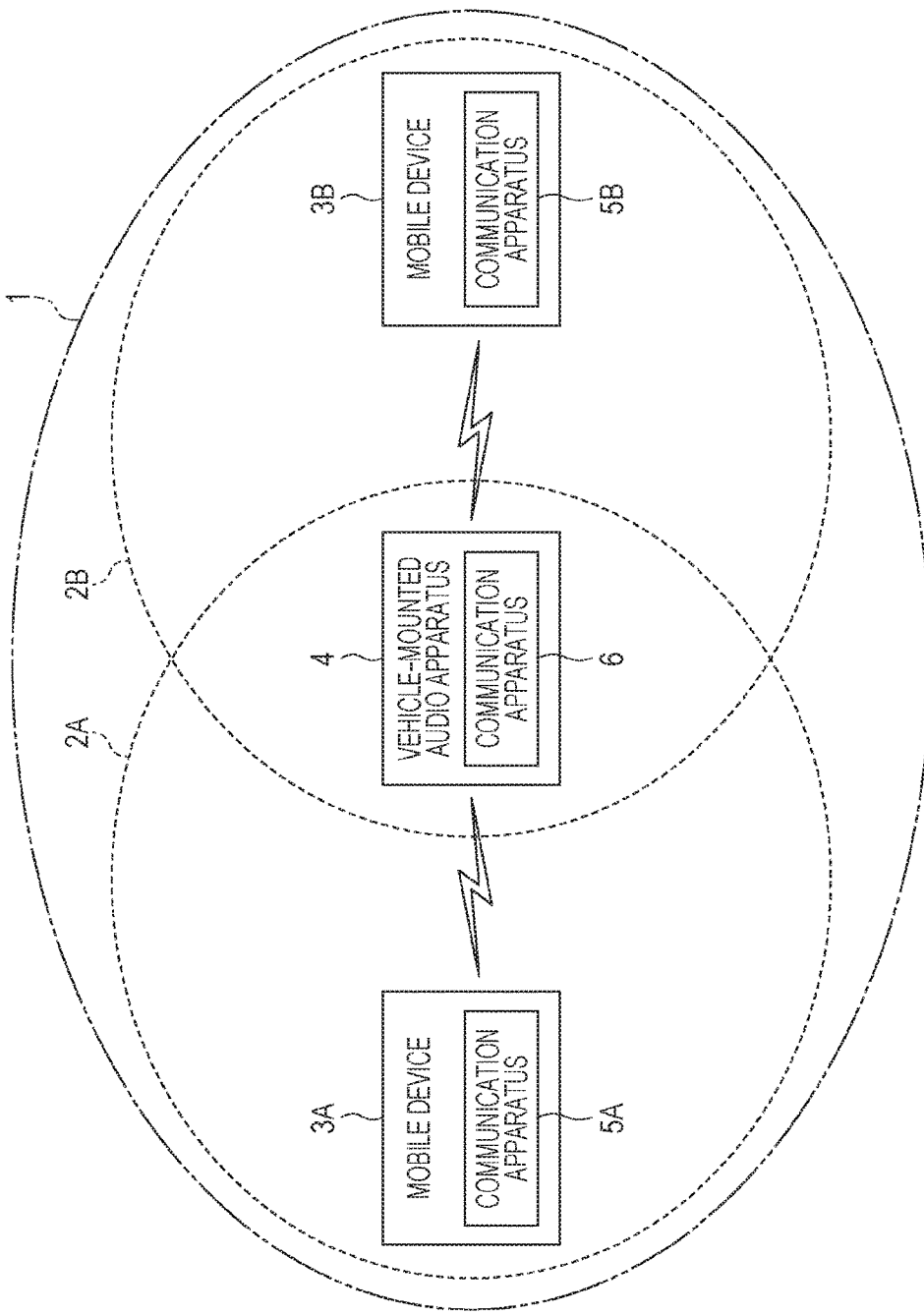
FIG. 1 illustrates an example in which a communication apparatus in an embodiment of the present invention belongs to a plurality of piconets.

An embodiment of the present invention will be described below with reference to the drawings. FIG. 1 illustrates an example in which a communication apparatus 6 in the embodiment of the present invention belongs to a plurality of piconets 2A and 2B. In the example in FIG. 1, the communication apparatus 6 a Bluetooth communication module (sometimes referred to below as the BT communication module) mounted in a vehicle-mounted audio apparatus 4. The communication apparatus 6 communicates in BT with a communication apparatus 5A mounted in a mobile device 3A and with a communication apparatus 5B mounted in a mobile device 3B, the communication apparatuses 5A and 5B being a BT communication module, the mobile devices 3A and 3B being a smartphone, a mobile music player, or the like. In this description, the communication partners of the communication apparatus 6 (communication apparatuses 5A and 5B in the example in FIG. 1) will sometimes be referred to as the distant apparatuses. The communication apparatus 6 can communicate with a plurality of distant apparatuses disposed in the interior of the vehicle.

In the example in FIG. 1, the communication apparatus 6 belongs to two piconets denoted 2A and 2B. The two piconets 2A and 2B, which are overlapping through the communication apparatus 6, constitute a scatternet 1. The communication apparatus 5A belongs to the piconet 2A and communication apparatus 5B belongs to the piconet 2B.

In each piconet in BT communication, one communication apparatus functions as the master and other communication apparatuses each function as a slave. The master performs overall control over communication with the slaves in the piconet. Each slave communicates only with the master. The communication apparatus 6 in the example in FIG. 1 functions as a slave in at least one of the two piconets 2A and 2B.

Figure 2:
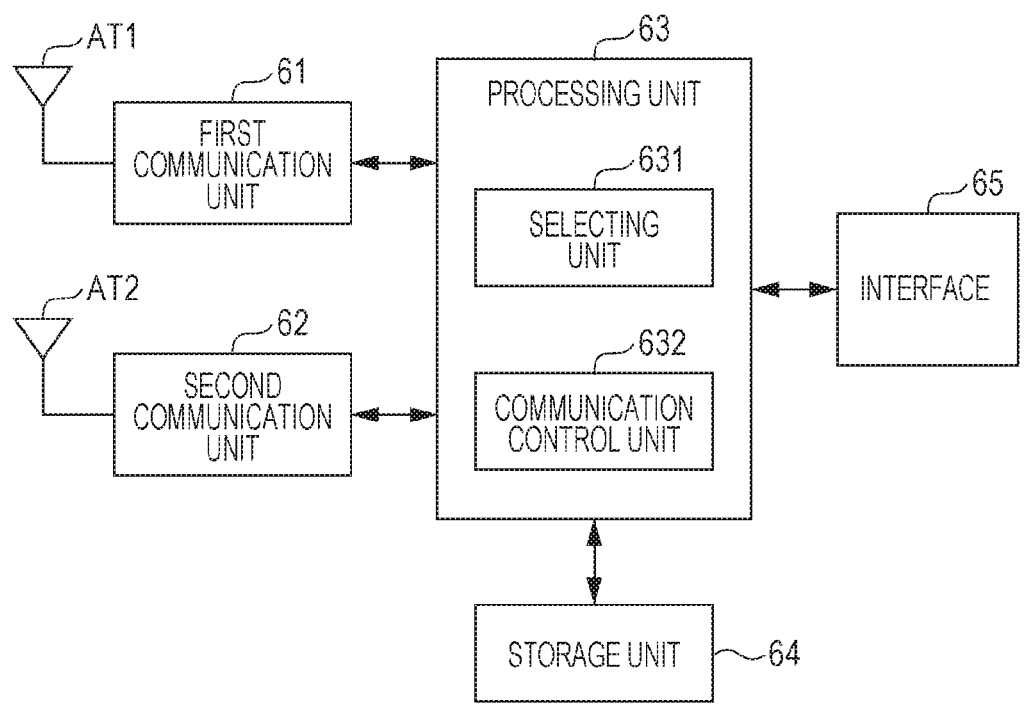
FIG. 2 illustrates an example of the structure of the communication apparatus in the embodiment of the present invention.

FIG. 2 illustrates an example of the structure of the communication apparatus 6 in this embodiment.

The communication apparatus 6 in FIG. 2 has antennas AT1 and AT2, a first communication unit 61, a second communication unit 62, a processing unit 63, a storage unit 64, and an interface 65.

The first communication unit 61 communicates with a distant apparatus in a communication method based on Basic Rate (BR) and Enhanced Data Rate (EDR) in the BT Core Specification (this method will sometimes be referred to below as the first communication method). Specifically, to communicate with a distant apparatus, the first communication unit 61 uses FHSS in which frequency hopping is performed at intervals of one slot (625 µs). When the communication apparatus 6 functions as the master, the first communication unit 61 manages the timings of slots, frequency hopping patterns, and the like in the piconet.

The second communication unit 62 communicates with a distant apparatus in a communication method in which a wireless local area network (LAN) conforming to IEEE802.11 is used on the basis of Bluetooth+HS, which is an extended BT specification (this method will sometimes be referred to below as the second communication method). The second communication unit 62 operates as the physical layer and data link layer for wireless LANs in IEEE802.11. The operation of the second communication unit 62 conforms to an upper layer in BT due to a function called Alternate MAC/PHY (AMP) stipulated in Bluetooth+HS. Specifically, the second communication unit 62 uses spectrum spread or orthogonal frequency division multiplex (OFDM) to communicate with distant apparatuses.

The second communication method based on Bluetooth+HS that uses a wireless LAN and the first communication method based on Bluetooth (BR/EDR) have different features. The communication speed (nominally, 24 Mbps) in the second communication method is higher than the communication speed (up to 3 Mbps) in the first communication method, but the first communication method preferably consumes less power than the second communication method.

The antenna AT1 is used by the first communication unit 61 to transmit and receive radio waves, and the antenna AT2 is used by the second communication unit 62 to transmit and receive radio waves. In another example in this embodiment, a single antenna may be shared by the first communication unit 61 and second communication unit 62 to transmit and receive radio waves.

The processing unit 63 is a circuit that controls the first communication unit 61 and second communication unit 62 so that processing to communicate with distant apparatuses is performed. For example, the processing unit 63 includes a computer (such as a microprocessor) that executes instructions according to a program stored in the storage unit 64 and also includes a specific logic circuit (such as an application-specific integrated circuit (ASIC)). The processing unit 63 may use the computer to perform all processing or may use the specific logic circuit to perform at least part of processing.

The processing unit 63 has a selecting unit 631 and a communication control unit 632 as functional blocks involved in processing to communicate with distant apparatuses.

Selecting Unit 631

The selecting unit 631 selects any one of the first communication unit 61 and second communication unit 62 for each distant apparatus with which to communicate, as the communication unit to be used in communication. The selecting unit 631 selects a communication unit to be used in communication with the distant apparatus, depending on which of cases (1) and (2) below applies.

(1) In the case in which communication with a first distant apparatus and communication with a second distant apparatus are concurrently performed In this case, the selecting unit 631 selects the first communication unit 61 for communication with the first distant apparatus and also selects the second communication unit 62 for communication with the second distant apparatus. The first distant apparatus performs communication of data for which a change in data transfer rate is required to be suppressed (this data will sometimes be referred to below as the first type of data). The second distant apparatus performs communication of data for which a change in data transfer rate is permitted (this data will sometimes be referred to below as the second type of data).

Examples of the first type of data for which a change in data transfer rate is required to be suppressed include voice data during a call, audio data used to reproduce music, and other streaming data. The selecting unit 631 decides whether the distant apparatus is the first distant apparatus that performs communication of the first type of data, according to, for example, communication link type and profile.

Communication links in BT communication are classified into two types, Synchronous Connection Oriented (SCO) link for line-switched communication and Asynchronous Connection-Less (ACL) link for store and forward communication. In ACL communication, packets are transmitted in unspecified slots. In SCO communication, however, packets are transmitted in reserved slots at fixed intervals. Therefore, SCO communication is used in applications in which it is strictly required to suppress a packet loss and a delay in communication due to a reduction in data transfer rate. Specifically, in the Hands-Free Profile (HFP), which is used for hands-free devices that originate and receive calls by wireless, SCO communication is performed in a period during which voice data of a call is transferred. When SCO communication with a distant apparatus is performed, the selecting unit 631 decides that the distant apparatus is the first distant apparatus.

A profile, which is a communication procedure for master-slave BT communication, is stipulated for each application in master-slave communication. In addition to the HFP, described above, for hands-free devices, other profiles are also available. For example, the Human Interface Device Profile (HID) is used for a mouse and other input devices, the Handset Profile (HSP) is used for communication with a headset, the Phone Book Access Profile (PBAP) is used to transfer phone book data, and the Message Access Profile (MAP) is used to transmit and receive messages between devices. The selecting unit 631 decides, as the first distant apparatus, a distant apparatus that communicates by using a profile intended for applications in which it is relatively strictly required to suppress a delay in communication and a packet loss. For example, the selecting unit 631 decides, as the first distant apparatus, a distant apparatus that communicates by using the Advanced Audio Distribution Profile (A2DP), which is a profile intended for voice transfer.

The second type of data, for which a change in data transfer rate is permitted, is such that even if the data transfer rate changes discontinuously to a certain extent, a disadvantage such as a sound skip in audio data is less likely to occur. An example of the second type of data is phone book data, which is data for which a change in data transfer rate is permitted and the communication load of which is relatively high (the mount of transferred data is relatively large). The selecting unit 631 decides whether the distant apparatus is the second distant apparatus that performs communication of the second type of data, according to, for example, the profile. Specifically, the selecting unit 631 decides, as the second distant apparatus, a distant apparatus that communicates by using a profile, such as the PBAP according to which phone book data is transferred, in which a load on communication of data other than the first type of data is relatively high. In another example in this embodiment, all distant apparatuses other than first distant apparatuses may be decided as second distant apparatuses.

When the first communication unit 61 is selected for communication with a first distant apparatus and the second communication unit 62 is selected for communication with a second distant apparatus, the first type of data (such as streaming data) is transferred at the basic speed in BT communication. However, the second type of data (such as phone book data) is transferred at a speed higher than the basic speed. Therefore, a data transfer speed required to maintain communication quality is assured for the first type of data, and communication time for the second type of data is shortened. Therefore, a collision with the first type of data is less likely to occur.

The case in which communication with a first distant apparatus and communication with a second distant apparatus are concurrently performed described above may be limited to or may not limited to the case in which a first distant apparatus and a second distant apparatus belong to different piconets (that is, a scatternet is formed). When the above case is limited to the case in which a scatternet is formed, the second communication unit 62 is used less frequently than when the above case is not limited to the case in which a scatternet is formed. This can suppress an increase in power consumption.

(2) In the case in which communication with a first distant apparatus and communication with a second distant apparatus are not concurrently performed In this case, the selecting unit 631 preferably selects the first communication unit 61 for communication with all distant apparatuses that can communicate in the first communication method. In BT communication, the first communication method based on Bluetooth (BR/EDR) is a requisite, so all distant apparatuses that perform BT communication are basically can communicate in the first communication method.

Communication Control Unit 632

The communication control unit 632 performs flow control in communication with a distant apparatus. In this flow control, the amount of data that can be transmitted continuously from a transmitting communication apparatus is restricted. When the number of packets that have been continuously transmitted reaches a predetermined number, the transmitting communication apparatus temporarily stops the packet transmission until the receiving communication apparatus permits packet transmission.

In the case in which a distant apparatus performs transmission, the communication control unit 632 transmits, to the distant apparatus, a signal that permits transmission to the communication apparatus 6 in which the communication control unit 632 is included (the signal will sometimes be referred to as the transmission permission signal). When the number of packets that have been continuously transmitted to the communication apparatus 6 reaches a predetermined number, the distant apparatus temporarily stops the packet transmission until the distant apparatus receives a transmission permission signal from the communication apparatus 6.

In this embodiment, the communication control unit 632 preferably performs flow control based on a credit. The credit preferably corresponds to the number of packets that the transmitting communication apparatus is permitted to continuously transmit. In BT communication, the credit indicates the number of packets in the Radio Frequency Communication (RFCOMM), which is a protocol layers (these packets are RFCOMM frames). In credit-based flow control, the receiving communication apparatus specifies a credit for the transmitting communication apparatus. The transmitting communication apparatus continuously transmits as many packets as the number corresponding to the credit, after which the transmitting communication apparatus temporarily stops the packet transmission until a new credit is specified by the receiving communication apparatus.

In the case in which a distant apparatus performs transmission, the communication control unit 632 transmits a signal that specifies a credit to the distant apparatus as a transmission permission signal. The distant apparatus continuously transmits as many packets as the number corresponding to the credit to the communication apparatus 6, after which the distant apparatus temporarily stops the packet transmission until the distant apparatus receives a transmission permission signal that specifies a new credit from the communication apparatus 6. For example, each time the distant apparatus transmits one packet, the distant apparatus decrements the value of the credit transmitted from the communication apparatus 6 as a transmission permission signal by one. When the value of the credit falls to zero, the distant apparatus temporarily stops the packet transmission. The communication control unit 632 takes the value of the credit that has been transmitted to the distant apparatus as a transmission permission signal, as an initial value. Each time the communication control unit 632 receives one packet from the distant apparatus, the communication control unit 632 decrements the value of the credit by one. When the value of the credit falls to zero, the communication control unit 632 transmits, to the distant apparatus, a transmission permission signal that specifies a new credit.

In this embodiment, in the case described in (1) above, in which communication with a first distant apparatus and communication with a second distant apparatus are concurrently performed, in flow control in communication with the second distant apparatus, the communication control unit 632 preferably inserts a delay before transmitting a transmission permission signal to the second distant apparatus. Specifically, in the case in (1) above, after as many packets as the number corresponding to the credit specified in a transmission permission signal have been received from the second distant apparatus, the communication control unit 632 inserts a delay before transmitting a transmission permission signal to the second distant apparatus again. Due to the inserted delay, an interval between transmissions of a transmission permission signal to the second distant apparatus is prolonged and an interval between packet transmissions from the second distant apparatus to the communication apparatus 6 is thereby prolonged. Therefore, the period of transmission from the second distant apparatus and the period of transmission from another distant apparatus are less likely to overlap each other.

The communication control unit 632 may fix this delay to be inserted before a transmission permission signal is transmitted or may change the delay depending on the communication rate and other conditions. For example, the communication control unit 632 may measure the data communication rate between the second distant apparatus and the communication apparatus 6 and may change the delay depending on the measurement result. If the data communication rate between the second distant apparatus and the communication apparatus 6 is raised, when the delay described above is prolonged, a collision in communication is less likely to occur in spite of the raised data communication rate.

In this embodiment, in the case described in (1) above, in which communication with a first distant apparatus and communication with a second distant apparatus are concurrently performed, in flow control in communication with the second distant apparatus, the communication control unit 632 preferably transmits, to the second distant apparatus, a signal that specifies a minimum value as the number of packets that are permitted to be transmitted in succession from the second distant apparatus. Specifically, in the case in (1) above, the communication control unit 632 preferably transmits a signal that specifies a credit with a minimum value to the second distant apparatus. This minimum value is specifically 1. When the credit is set to 1, each time the second distant apparatus transmits one packet to the communication apparatus 6, the credit falls to zero, so transmission from the second distant apparatus is temporarily stopped until the communication apparatus 6 specifies a credit by using a new transmission permission signal. When transmission is temporarily stopped easily, the interval between transmissions from the second distant apparatus to the communication apparatus 6 is prolonged. Therefore, the period of transmission from the second distant apparatus and the period of transmission from another distant apparatus are less likely to overlap each other.

When the state in (1) above is canceled and the state in (2) above is entered again, the communication control unit 632 stops the insertion of a delay, which would otherwise be inserted before a transmission permission signal is transmitted to the second distant apparatus. Therefore, an interval between transmissions of a transmission permission signal to the second distant apparatus is shortened and an interval between packet transmissions from the second distant apparatus to the communication apparatus 6 is thereby shortened. Therefore, the rate at which data is transferred from the distant apparatus is raised.

In addition, when the state in (1) above is canceled and the state in (2) above is entered again, the communication control unit 632 preferably transmits a signal that specifies a credit larger than the credit with the minimum value to the second distant apparatus for which the credit with the minimum value had been specified before the state in (1) above has been canceled. For example, the communication control unit 632 transmits, to the second distant apparatus, a signal that specifies a credit corresponding to the number of packets that can be continuously received by the communication apparatus 6 (that number is the upper limit of the number of packets that can be expected to be continuously received by the communication apparatus 6 without a loss). Therefore, communication is performed between the second distant apparatus and the communication apparatus 6 at a superior transfer rate without any packet being lost.

This completes the description of the processing unit 63.

The storage unit 64 stores data prepared in advance so that the processing unit 63 uses the data in processing and also stores variable data that are temporarily saved during processing. If the processing unit 63 includes a central processing unit (CPU), the storage unit 64 may store programs to be executed by the CPU. The storage unit 64 includes, for example, a volatile memory, such as a dynamic random access memory (DRAM) or a static random access memory (SRAM), and a non-volatile memory such as a flash memory.

The interface 65 is a circuit used to transmit and receive data (transmission data, reception data, and the like) between the communication apparatus 6 and another controller (such as integrated circuit (IC) chip that controls the vehicle-mounted audio apparatus 4 in which the communication apparatus 6 is mounted). The processing unit 63 may read data and programs from the other controller through the interface 65 and may store them in the storage unit 64.

Figure 3:
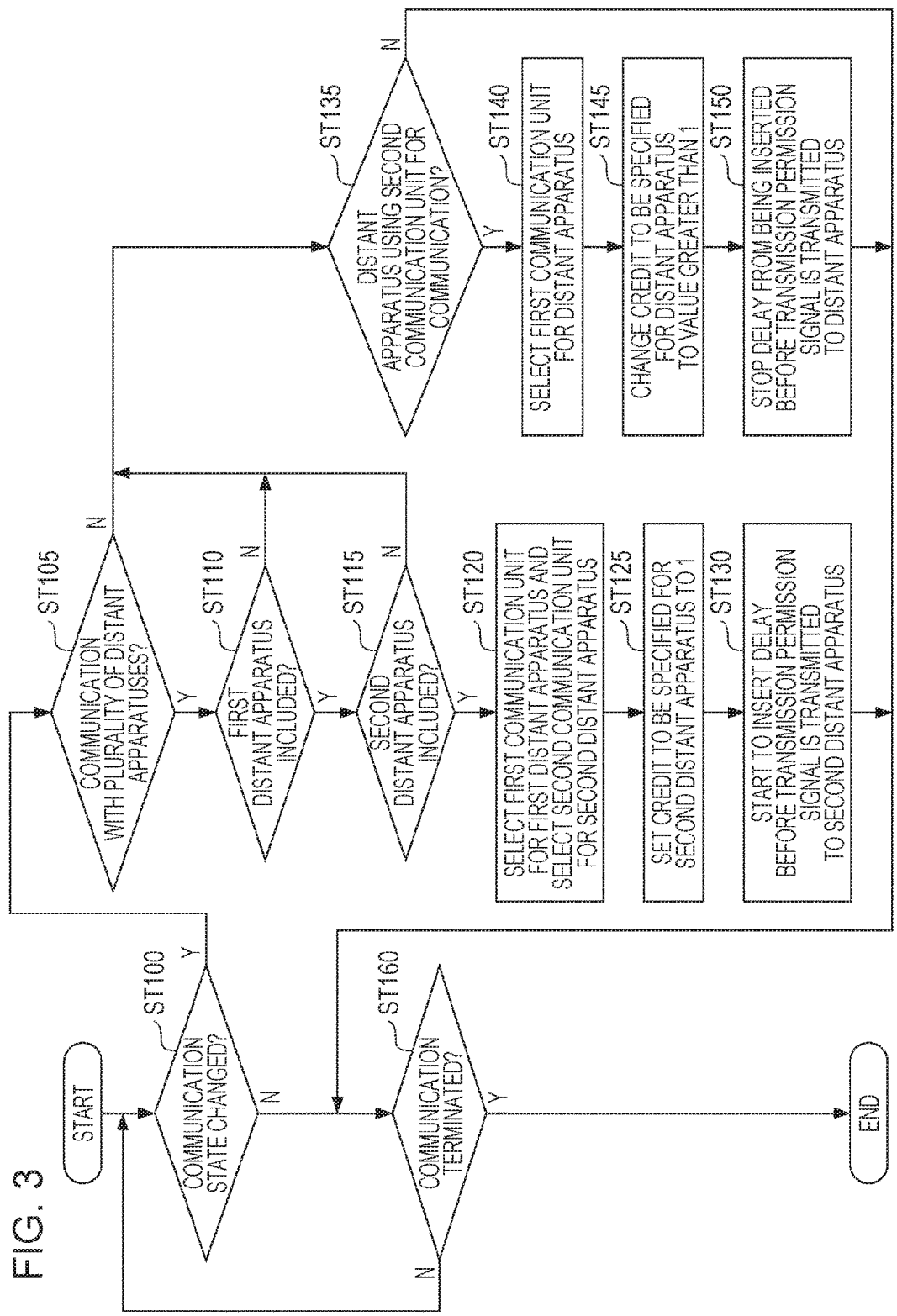
FIG. 3 is a flowchart illustrating an example of processing performed by the communication apparatus in the embodiment of the present invention reduces communication collisions.

Now, the operation of the communication apparatus 6, structured as described above, in this embodiment will be described. FIG. 3 is a flowchart illustrating an example of processing performed by the communication apparatus 6 in this embodiment to reduce communication collisions.

The selecting unit 631 decides whether the state of communication with another distant apparatus has been changed (ST100). If, for example, communication with at least one distant apparatus has been started or terminated, the selecting unit 631 decides that the communication state has been changed. Alternatively, if, for example, a new connection to a distant apparatus has been established, a connection to a distant apparatus has been terminated, or a profile for communication with a distant apparatus has been changed, the selecting unit 631 may decide that the communication state has been changed.

If the state of communication with another distant apparatus has not been changed, the selecting unit 631 decides whether the BT communication has been terminated (ST160). If the BT communication is in progress, the selecting unit 631 makes a decision in step ST100 again.

If the state of communication with another distant apparatus has been changed, the selecting unit 631 decides whether the new state is such that communication with a plurality of distant apparatuses is to be concurrently performed (ST105). If communication with a plurality of distant apparatuses is to be concurrently performed in the new state (the result in ST105 is Yes), the selecting unit 631 decides whether at least one first distant apparatus is included in the plurality of distant apparatuses (ST110) and also decides whether at least one second distant apparatus is included in the plurality of distant apparatuses (ST115).

If, in the new state, communication with the first distant apparatus and communication with the second distant apparatus are to be concurrently performed, the selecting unit 631 selects the first communication unit 61 for the communication with the first distant apparatus and also selects the second communication unit 62 for the communication with the second distant apparatus (ST120). The selecting unit 631 selects the first communication unit 61 for all other communications with distant apparatuses.

In the state in which communication with the first distant apparatus and communication with the second distant apparatus are to be concurrently performed, the communication control unit 632 sets a credit to be specified for the second distant apparatus to 1 (ST125) and starts processing to insert a delay before a transmission permission signal is transmitted to the second distant apparatus (ST130). When transmitting a transmission permission signal to the second distant apparatus, the communication control unit 632 specifies the credit set in step ST125 in the transmission permission signal.

If the new state is such that communication with a plurality of distant apparatuses is not to be concurrently performed (the result in ST105 is No), any first distant apparatus is not included in the plurality of distant apparatuses (the result in ST110 is No), or any second distant apparatus is not included in the plurality of distant apparatuses (the result in ST115 is No), the selecting unit 631 decides whether a distant apparatus that is using the second communication unit 62 to communicate is identified from the distant apparatuses that are in communication (ST135). If a distant apparatus that is using the second communication unit 62 to communicate is identified, the selecting unit 631 changes the communication unit to be used for communication with the distant apparatus from the second communication unit 62 to the first communication unit 61 (ST140). The communication control unit 632 also changes the value of the credit to be specified for the distant apparatus identified in step ST135 to a value greater than 1 (ST145) and stops the insertion of a delay, which would otherwise be inserted before a transmission permission signal is transmitted to the distant apparatus (ST150).

Upon the completion of processing in steps ST105 to ST150, the selecting unit 631 decides whether the BT communication has been terminated (ST160). If the BT communication is in progress, the selecting unit 631 returns to step ST100 and repeats processing as described above.

Figure 4:
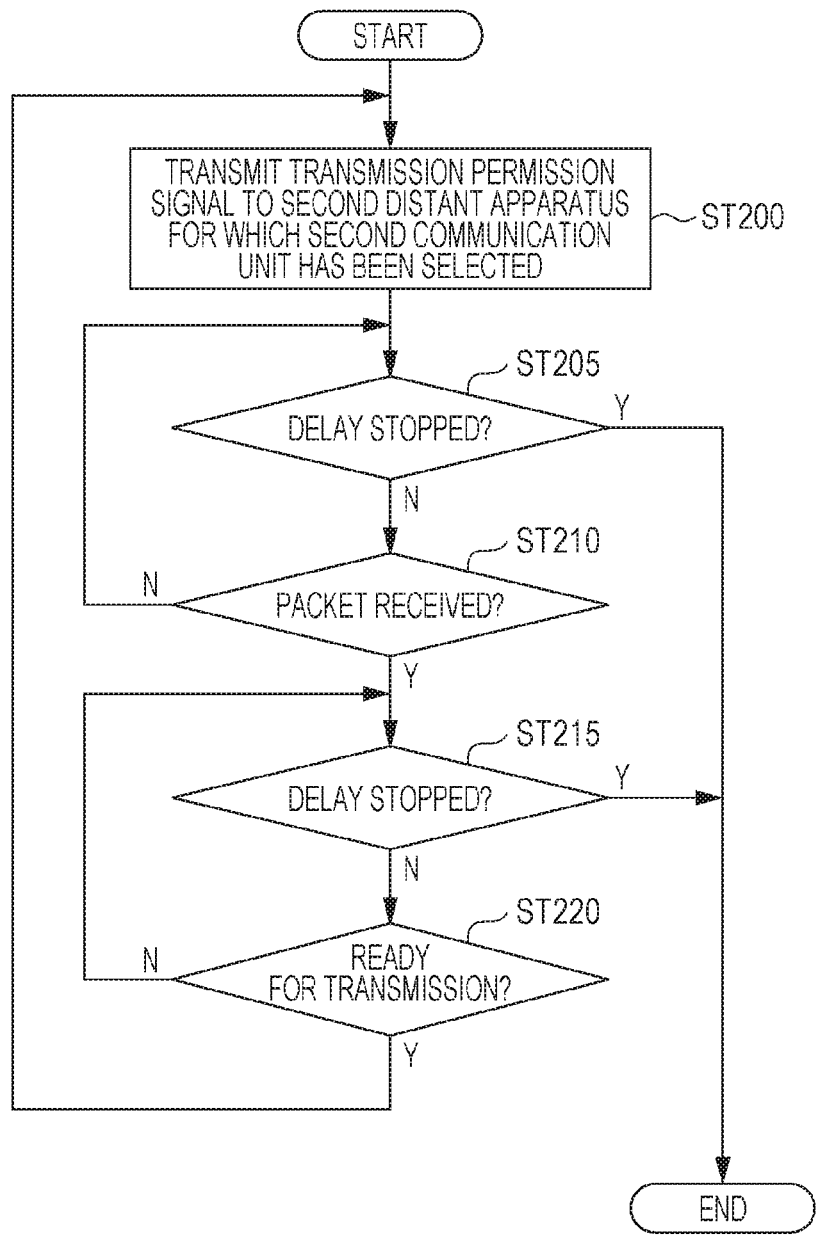
FIG. 4 is a flowchart illustrating processing to delay the transmission of a transmission permission signal.

FIG. 4 is a flowchart illustrating processing to delay the transmission of a transmission permission signal. Processing illustrated in FIG. 4 is executed if processing to insert a delay before a transmission permission signal is transmitted is executed in step ST130 in FIG. 3. First, the communication control unit 632 transmits a transmission permission signal that specifies a credit with the minimum value to the second distant apparatus (ST200). After having transmitted the transmission permission signal, unless the communication control unit 632 stops the insertion of a delay in step ST150 in FIG. 3 (the result in ST205 is No), the communication control unit 632 monitors the reception of a packet from the distant apparatus (ST210). If one packet corresponding to the credit with the minimum value is received from the second distant apparatus, unless the communication control unit 632 stops the insertion of a delay in step ST150 in FIG. 3 (the result in step ST215 is No), the communication control unit 632 waits until a timing at which to retransmit a transmission permission signal to the second distant apparatus is reached (ST220). If, for example, a time elapsed from when one packet was received from the second distant apparatus reaches a predetermined time, the communication control unit 632 decides that a timing at which to retransmit a transmission permission signal has been reached. At the timing at which to retransmit a transmission permission signal to the communication party, the communication control unit 632 returns to step ST200, where the communication control unit 632 retransmits a transmission permission signal that specifies the minimum value to the second distant apparatus.

Next, specific examples of operations of the communication apparatus 6 in this embodiment will be described with reference to FIGS. 5 and 6. In these drawings, each rectangle illustrated together with an arrow represents a packet. A hollow rectangle represents a packet transmitted or received in the first communication method, and a hatched rectangle represents a packet transmitted or received in the second communication method.

Figure 5:
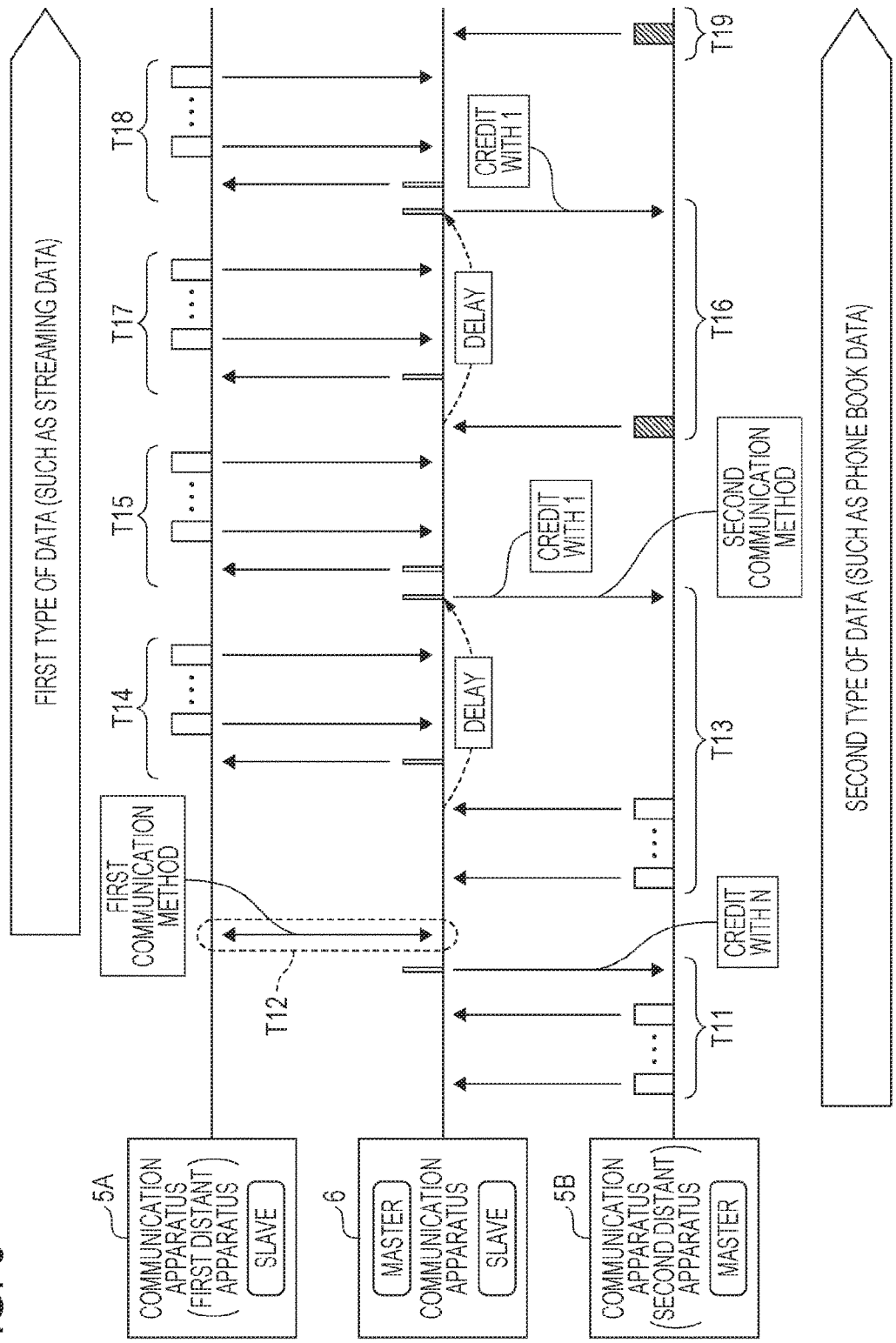
FIG. 5 illustrates an example of an operation to start communication with a first distant apparatus while in communication with a second distant apparatus.

FIG. 5 illustrates an example of an operation of the communication apparatus 6 in this embodiment to start communication with a first distant apparatus while in communication with a second distant apparatus. In the example in FIG. 5, the communication apparatus 6 first communicates with a communication apparatus 5B in the first communication method (T11). The communication apparatus 6 has specified N (N is an integer greater than 1) as a credit for the communication apparatus 5B. After that, the communication apparatus 6 also starts communication with a communication apparatus 5A (T12). The communication apparatus 6 decides that the communication apparatus 5A is a first distant apparatus and the communication apparatus 5B is a second distant apparatus, according to the communication link types and profiles.

Since the communication apparatus 6 has become ready for concurrently communicating with the first distant apparatus and second distant apparatus, the communication apparatus 6 selects the first communication unit 61 for communication with the first distant apparatus (communication apparatus 5A) and also selects the second communication unit 62 for communication with the second distant apparatus (communication apparatus 5B). At the time of starting communication with the first distant apparatus (communication apparatus 5A), which is a slave, the communication apparatus 6 notifies the first distant apparatus (communication apparatus 5A) that the first communication method will be used (T12). At the time of transmitting a transmission permission signal to the second distant apparatus (communication apparatus 5B), which is the master, the communication apparatus 6 notifies the second distant apparatus (communication apparatus 5B) that the second communication method will be used (T13).

Since the second communication unit 62 is used for communication with the second distant apparatus (communication apparatus 5B), the second type of data (such as phone book data) is transferred at a speed higher than the basic speed in BT communication. This shortens the period of the transmission of the second type of data, so a collision with the first type of data (such as streaming data) is less likely to occur. In addition, since the first type of data (such as streaming data) is transferred in the first communication method at the basic speed in BT communication, the communication quality of the first type of data is maintained.

After the communication apparatus 6 has received as many packets as specified by the credit from the second distant apparatus (communication apparatus 5B), the communication apparatus 6 inserts a delay before transmitting a transmission permission signal for a next packet to the second distant apparatus (communication apparatus 5B) (T13 and T16). In the transmission permission signal, the communication apparatus 6 sets the credit to be specified for the second distant apparatus (communication apparatus 5B) to 1 (T13 and T16). Thus, when the communication apparatus 6 receives one packet corresponding to the credit from the second distant apparatus (communication apparatus 5B), the communication apparatus 6 transmits a transmission permission signal after the elapse of a certain delay time (T13 and T16). Each time the second distant apparatus (communication apparatus 5B) transmits one packet, the credits falls to zero. Therefore, each time the second distant apparatus (communication apparatus 5B) receives one transmission permission signal with the credit set to 1 from the communication apparatus 6, the second distant apparatus (communication apparatus 5B) transmits only one packet (T16 and T19).

When a delay is inserted before a transmission permission signal is transmitted, an interval between transmissions of a transmission permission signal to the second distant apparatus (communication apparatus 5B) is prolonged and an interval between packet transmissions from the second distant apparatus (communication apparatus 5B) to the communication apparatus 6 is thereby prolonged. When the credit is set to a small number, the number of packets that the second distant apparatus (communication apparatus 5B) transmits continuously in response to the reception of one transmission permission signal is reduced, so the second distant apparatus (communication apparatus 5B) is likely to temporarily stop transmission. As a result, since an interval between packet transmissions from the second distant apparatus (communication apparatus 5B) is prolonged, an overlap is less likely to occur between periods of packet transmission from the second distant apparatus (communication apparatus 5B) at T13, T16, and T19 and periods of packet transmission from the first distant apparatus (communication apparatus 5A) at T14, T15, T17, and T18.

Figure 9:
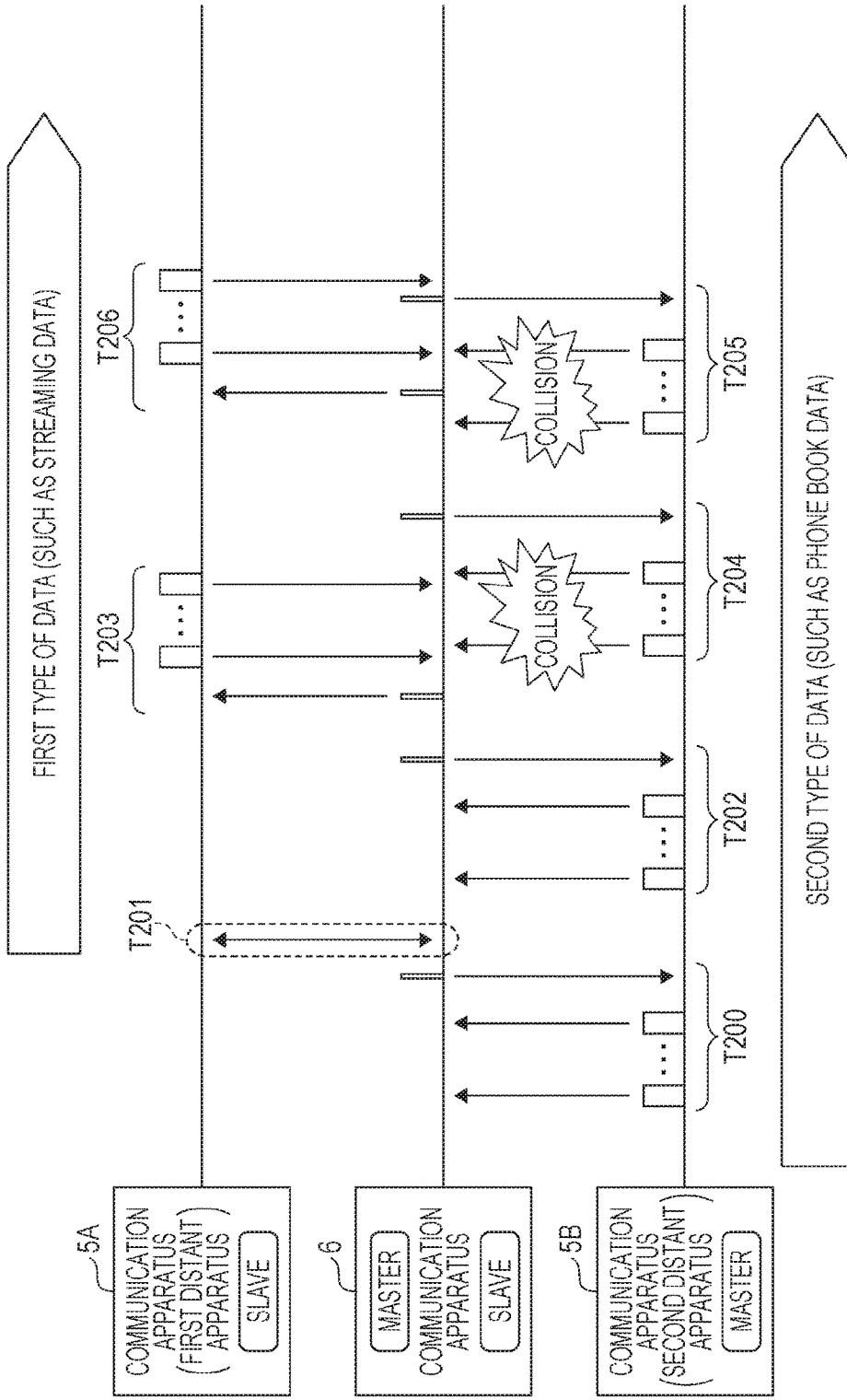
FIG. 9 illustrates a comparative example of the operation in FIG. 5.

FIG. 9 illustrates a comparative example for FIG. 5; in the comparative example, the high-speed second communication unit 62 is not used in communication with the second distant apparatus (communication apparatus 5B) and neither processing to delay the transmission of a transmission permission signal nor processing to change the value of a credit is performed. In this comparative example as well, the communication apparatus 6 first communicates with the second distant apparatus (communication apparatus 5B) (T200), after which the communication apparatus 6 starts communication with the first distant apparatus (communication apparatus 5A) (T201). Since the speed in communication with the second distant apparatus (communication apparatus 5B) is lower than in the example in FIG. 5, the total period of packet transmission from the second distant apparatus (communication apparatus 5B) is long. Since neither processing to delay the transmission of a transmission permission signal nor processing to change the value of a credit is performed, an interval between packet transmissions from the second distant apparatus (communication apparatus 5B) is short. Therefore, an overlap occurs between a period of packet transmission from the second distant apparatus (communication apparatus 5B) at T204 and a period of packet transmission from the first distant apparatus (communication apparatus 5A) at T203 and between a period of packet transmission from the second distant apparatus (communication apparatus 5B) at T205 and a period of packet transmission from the first distant apparatus (communication apparatus 5A) at T206.

Figure 6:
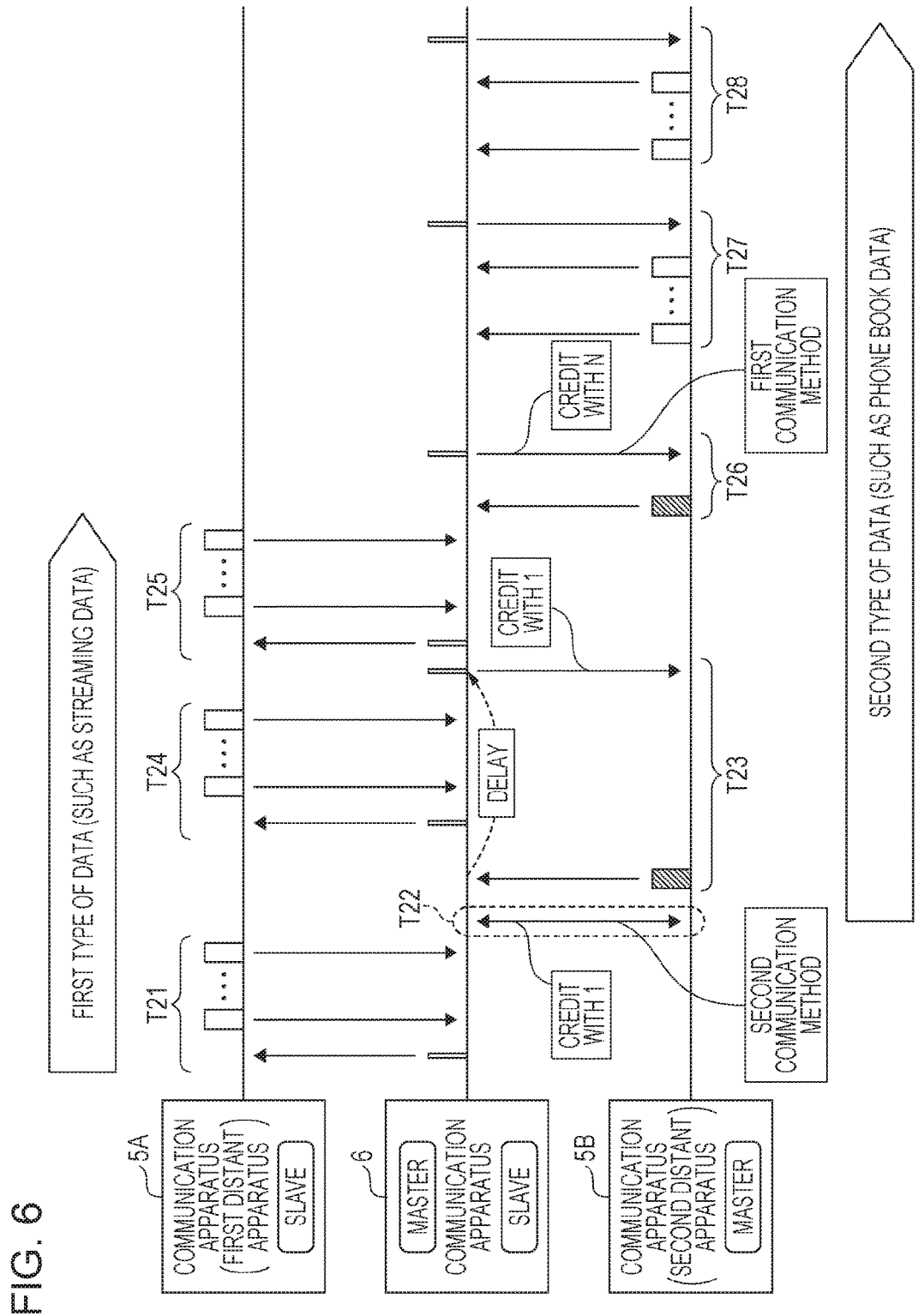
FIG. 6 illustrates an example of an operation to start communication with the second distant apparatus while in communication with the first distant apparatus and then terminate the communication with the first distant apparatus.

FIG. 6 illustrates an example of an operation of the communication apparatus 6 in this embodiment to start communication with the second distant apparatus while in communication with the first distant apparatus and then terminate the communication with the first distant apparatus.

In the example in FIG. 6, the communication apparatus 6 is first communicating with the communication apparatus 5A in the first communication method (T21), after which the communication apparatus 6 starts to communicate the communication apparatus 5B (T22). The communication apparatus 6 decides that the communication apparatus 5A is a first distant apparatus and the communication apparatus 5B is a second distant apparatus, according to the communication link types and profiles, as in the example in FIG. 5.

Since the communication apparatus 6 has become ready for concurrently communicating with the first distant apparatus and second distant apparatus, the communication apparatus 6 selects the first communication unit 61 for communication with the first distant apparatus (communication apparatus 5A) and also selects the second communication unit 62 for communication with the second distant apparatus (communication apparatus 5B). At the time of starting communication with the second distant apparatus (communication apparatus 5B), which is the master, the communication apparatus 6 notifies the second distant apparatus (communication apparatus 5B) that the second communication method will be used (T22). At the time of starting communication with the second distant apparatus (communication apparatus 5B), the communication apparatus 6 also sets a credit to be specified for the second distant apparatus (communication apparatus 5B) to 1 (T22) and inserts a delay during a period from when the communication apparatus 6 has received one packet from the second distant apparatus (communication apparatus 5B) until the communication apparatus 6 transmits a transmission permission signal for a next packet to the second distant apparatus (communication apparatus 5B) (T23). Thus, even in a state in which the communication apparatus 6 concurrently communicates with the first distant apparatus and second distant apparatus, a collision in communication is less likely to occur.

In the example in FIG. 6, communication with the first distant apparatus (communication apparatus 5A) is first terminated by the communication apparatus 6. Due to this termination of the communication, the communication apparatus 6 enters a state in which the communication apparatus 6 communicates with only the communication apparatus 5B, and the state in which the communication apparatus 6 concurrently communicates with the first distant apparatus and second distant apparatus is canceled. Accordingly, after the communication apparatus 6 has received the last packet from the first distant apparatus (communication apparatus 5A) (T25), the communication apparatus 6 changes the method of communicating with the second distant apparatus (communication apparatus 5B) from the second communication method to the first communication method (T26). The communication apparatus 6 also increases the value of the credit to be specified for the second distant apparatus (communication apparatus 5B) from 1 to N and stops the insertion of a delay, which would otherwise be inserted before a transmission permission signal is transmitted (T26). Subsequently, the second distant apparatus (communication apparatus 5B) transmits packets in the first communication method, and upon receipt of one transmission permission signal, transmits N packets in succession (T27 and T28). Upon receipt of the N packets from the second distant apparatus (communication apparatus 5B), the communication apparatus 6 transmits a next transmission permission signal to the second distant apparatus (communication apparatus 5B) in a relatively short time (T27 and T28).

Since the method of communicating with the second distant apparatus (communication apparatus 5B) is changed from the second communication method to the first communication method, an increase in power consumption can be suppressed. Since the value of a credit is increased, a temporary stop is less likely to occur during transmission from the second distant apparatus (communication apparatus 5B). Since processing to delay the transmission of a transmission permission signal is stopped, an interval between packet transmissions from the second distant apparatus (communication apparatus 5B) is shortened. Therefore, the rate at which data is transferred from the second distant apparatus (communication apparatus 5B) is raised.

As described above, with the communication apparatus 6 in this embodiment, in the case in which communication with a first distant apparatus and communication with a second distant apparatus are concurrently performed, the first communication unit 61 is selected for communication with the first distant apparatus and the second communication unit 62, which is faster than the first communication unit 61, is selected for communication with the second distant apparatus. Accordingly, communication time is shortened for the second type of data (such as phone book data), and a change in data transfer rate is permitted for the second type of data. Therefore, it is possible to make a collision in communication less likely to occur. On the other hand, the communication speed of the first type of data (such as streaming data) is low, and so, it is easy to suppress a change in data transfer rate. Therefore, it is possible to maintain the communication quality of the first type of data. Furthermore, since the communication speed of the second type of data is raised, time taken to transfer the second type of data can be shortened. In addition, if the first type of data is streaming data, an increase in power consumption can be suppressed by using the first communication unit 61 in communication of streaming data involving a relatively large amount of transfer and thereby taking a long communication period.

With the communication apparatus 6 in this embodiment, in the case in which communication with a first distant apparatus and communication with a second distant apparatus are not concurrently performed, the first communication unit 61, which consumes less power than the second communication unit 62, is used to communicate with all distant apparatuses. Therefore, it is possible to suppress an increase in power consumption.

With the communication apparatus 6 in this embodiment, in flow control in communication with a second distant apparatus, a delay is inserted before transmitting a transmission permission signal to the second distant apparatus, so a timing at which to permit the second distant apparatus to transmit to the communication apparatus 6 is delayed. Therefore, a time interval between transmissions from the second distant apparatus to the communication apparatus 6 is prolonged, and an overlap becomes less likely to occur between the period of transmission from the second distant apparatus and the period of transmission from another distant apparatus. Accordingly, it is possible to make a collision in communication less likely to occur.

With the communication apparatus 6 in this embodiment, in the case in which the state in which communication with the first distant apparatus and communication with the second distant apparatus are concurrently performed is canceled, processing to insert a delay before transmitting a transmission permission signal to the second distant apparatus is preferably stopped. Thus, a time interval between transmissions from the second distant apparatus to the communication apparatus 6 is thereby shortened. Therefore, the rate at which data is transferred from the second distant apparatus can be raised.

With the communication apparatus 6 in this embodiment, in the case in which communication with a first distant apparatus and communication with a second distant apparatus are concurrently performed, in flow control in communication with the second distant apparatus, the value of a credit specified for the second distant apparatus is minimized and the number of packets transmitted from the second distant apparatus in succession is thereby minimized. Therefore, a temporary stop in transmission from the second distant apparatus due to flow control is likely to occur, and the frequency of transmission from the second distant apparatus is thereby lowered. Therefore, an overlap is less likely to occur between the period of transmission from the second distant apparatus and the period of transmission from another distant apparatus. Therefore, it is possible to make a collision in communication less likely to occur.

With the communication apparatus 6 in this embodiment, in the case in which a state in which communication with the first distant apparatus and communication with the second distant apparatus are concurrently performed is canceled, the value of a credit specified for the second distant apparatus preferably becomes larger than the minimum value. Therefore, a temporary stop in transmission from the second distant apparatus due to flow control is less likely to occur, and the frequency of transmission from the second distant apparatus is thereby raised. Therefore, the rate at which data is transferred from the second distant apparatus can be raised.

With the communication apparatus 6 in this embodiment, in the case in which a first distant apparatus and a second distant apparatus belong to different piconets and communication with the first distant apparatus and communication with the second distant apparatus are concurrently performed, it is possible to make a collision in communication less likely to occur.

With the communication apparatus 6 in this embodiment, in the case in which the communication apparatus 6 incorporated in a vehicle-mounted electronic device (vehicle-mounted audio apparatus 4) concurrently communicates with a plurality of distant apparatuses (communication apparatuses 5A and 5B) incorporated in a plurality of mobile devices (mobile devices 3A and 3B) carried in the vehicle, it is possible to make a collision in communication less likely to occur.

Next, variations of the communication apparatus 6 in this embodiment will be described.

First Variation

With the communication apparatus 6 in a first variation, the communication control unit 632 does not perform processing to change the value of a credit. Specifically, the communication control unit 632 skips processing in steps ST125 and ST145 in the flowchart illustrated in FIG. 3.

Figure 7:
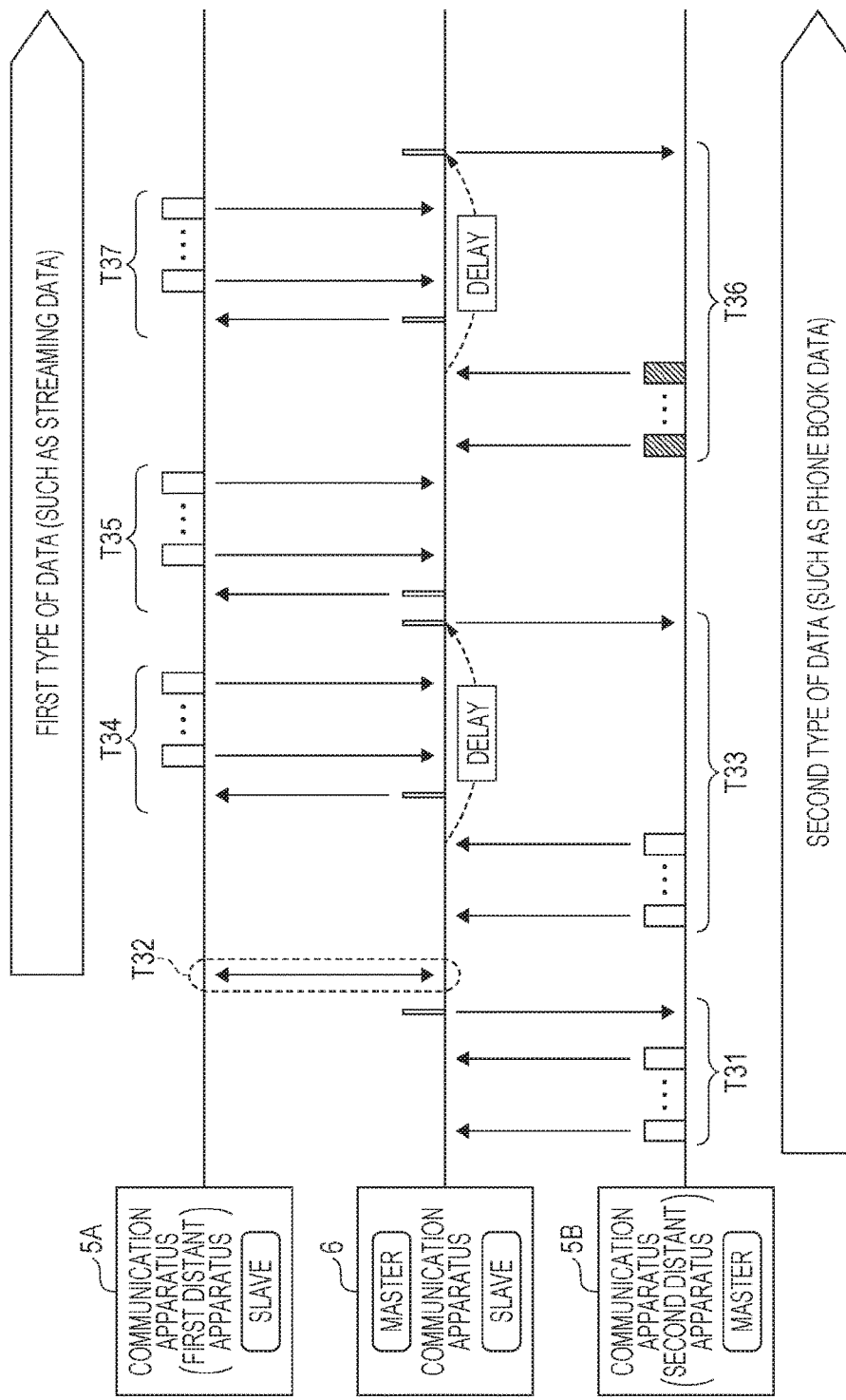
FIG. 7 illustrates an example of an operation in the case in which processing to change the value of a credit is omitted.

FIG. 7 illustrates an example of an operation in the case in which processing to change the value of a credit is omitted in the communication apparatus 6 in the first variation in this embodiment. In the operation example in FIG. 7 as well, the communication apparatus 6 first communicates with the communication apparatus 5B in the first communication method (T31), after which the communication apparatus 6 starts communication with the communication apparatus 5A (T32), as in the operation example in FIG. 5. The communication apparatus 6 decides that the communication apparatus 5A is a first distant apparatus and the communication apparatus 5B is a second distant apparatus, according to the communication link types and profiles. Since the communication apparatus 6 has become ready for concurrently communicating with the first distant apparatus and second distant apparatus, the communication apparatus 6 selects the first communication unit 61 for communication with the first distant apparatus (communication apparatus 5A) and also selects the second communication unit 62 for communication with the second distant apparatus (communication apparatus 5B). Therefore, the second distant apparatus (communication apparatus 5B) transmits packets to the communication apparatus 6 in the high-speed second communication method (T36). After the communication apparatus 6 has received N packets as specified by a credit from the second distant apparatus (communication apparatus 5B), the communication apparatus 6 inserts a delay before transmitting a transmission permission signal for next N packets to the second distant apparatus (communication apparatus 5B) (T33 and T36). With the communication apparatus 6 in the first variation as well, the period of transmission from the second distant apparatus (communication apparatus 5B) is shortened and an interval between transmissions from the second distant apparatus (communication apparatus 5B). Therefore, it is possible to make a collision in communication less likely to occur.

Second Variation

With the communication apparatus 6 in a second variation, the communication control unit 632 does not perform processing to delay the transmission of a transmission permission signal. Specifically, the communication control unit 632 skips processing in steps ST130 and ST150 in the flowchart illustrated in FIG. 3.

Figure 8:
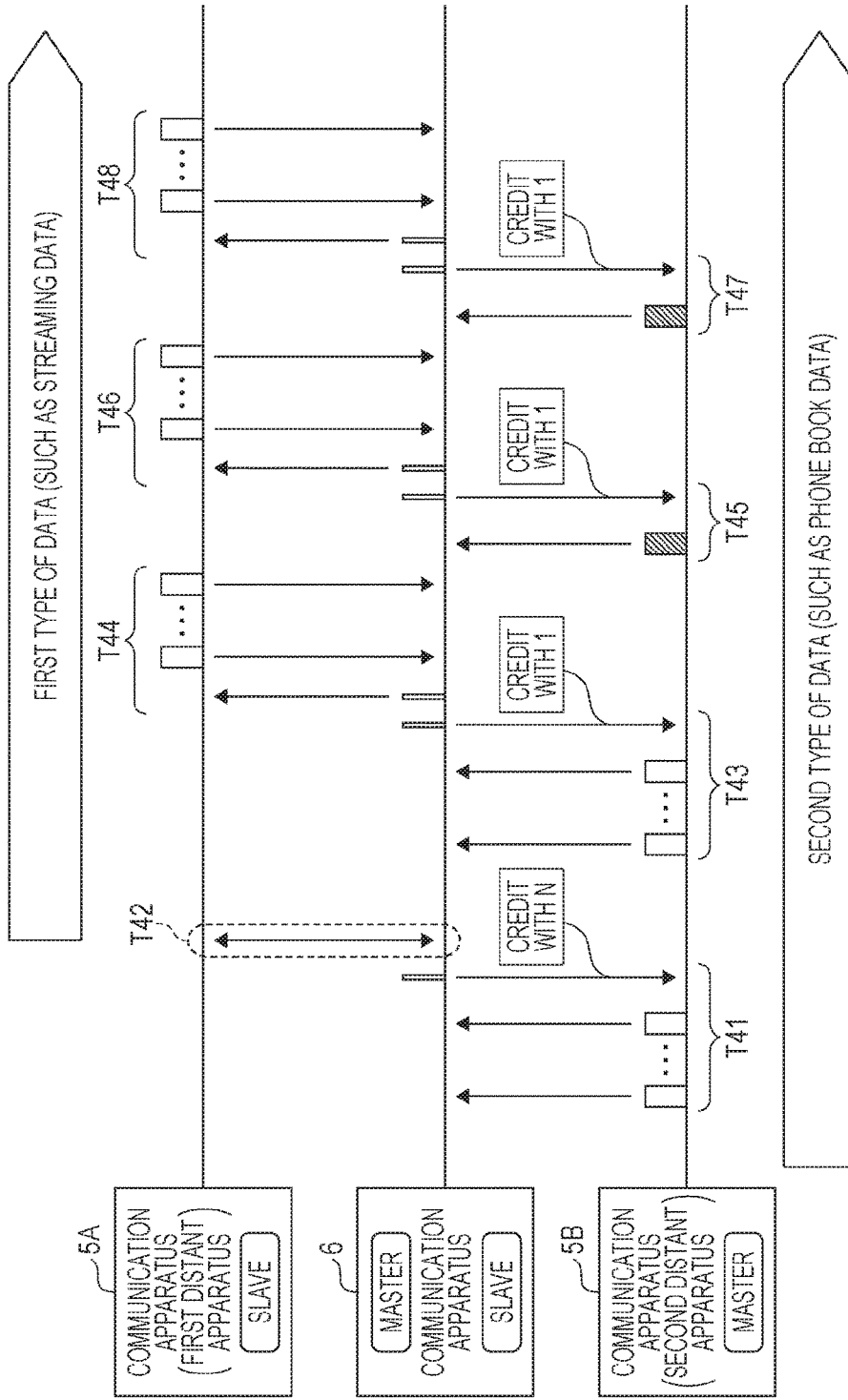
FIG. 8 illustrates an example of an operation in the case in which processing to delay the transmission of a transmission permission signal is omitted.

FIG. 8 illustrates an example of an operation in the case in which processing to delay the transmission of a transmission permission signal is omitted in the communication apparatus 6 in the second variation in this embodiment. In the operation example in FIG. 8 as well, the communication apparatus 6 first communicates with the communication apparatus 5B in the first communication method (T41), after which the communication apparatus 6 starts communication with the communication apparatus 5A (T42), as in the operation example in FIG. 5. The communication apparatus 6 decides that the communication apparatus 5A is a first distant apparatus and the communication apparatus 5B is a second distant apparatus, according to the communication link types and profiles. Since the communication apparatus 6 has become ready for concurrently communicating with the first distant apparatus and second distant apparatus, the communication apparatus 6 selects the first communication unit 61 for communication with the first distant apparatus (communication apparatus 5A) and also selects the second communication unit 62 for communication with the second distant apparatus (communication apparatus 5B). Therefore, the second distant apparatus (communication apparatus 5B) transmits a packet to the communication apparatus 6 in the high-speed second communication method (T45 and T47). The communication apparatus 6 also sets the credit to be specified for the second distant apparatus (communication apparatus 5B) to the minimum value (T43, T45, and T47). With the communication apparatus 6 in the second variation as well, the period of transmission from the second distant apparatus (communication apparatus 5B) is shortened and an interval between transmissions from the second distant apparatus (communication apparatus 5B) is prolonged. Therefore, it is possible to make a collision in communication less likely to occur.

So far, an embodiment and variations of the present invention have been described. However, the present invention is not limited only to this embodiment and these variations. The present invention includes other various variations.

For example, in the examples in the embodiment described above, the first distant apparatus has been a slave and the second distant apparatus has been the master. However, the present invention is not limited to these examples. That is, the first distant apparatus and second distant apparatus each may be a slave or may be the master.

In the examples in the embodiment described above, the first distant apparatus and second distant apparatus have belonged to different piconets. However, the present invention is not limited to these examples. That is, at least one first distant apparatus and at least one second distant apparatus may belong to the same piconet or may belong to different piconets.

In the examples in the embodiment described above, the present invention has been applied to BT communication. However, the present invention can be applied to other various types of communication methods.

What is claimed is:

1. A communication apparatus capable of concurrently communicating with a plurality of distant devices, the apparatus comprising:
    a first communication unit that communicates in a first communication method having a first communication speed;
    a second communication unit that communicates in a second communication method having a second communication speed higher than the first communication speed and consuming more power than the first communication method;
    a communication control unit that performs flow control in communication with the plurality of distant devices; and
    a selecting unit that selects, for each of the plurality of distant devices, one of the first and second communication units as a communication unit to be used for communication therewith,
    wherein the plurality of distant devices include:
        at least one first distant device that communicates a first type of data which requires to suppress a change in a data transfer rate; and
        at least one second distant device that communicates a second type of data which permits a change in a data transfer rate,
    wherein when the communication apparatus concurrently communicates with the at least one first distant device and at least one second distant device, the selecting unit selects the first communication unit for communication with the first distant device and selects the second communication unit for communication with the second distant device, and the communication control unit, in the flow control in communication with the second distant device, inserts a delay before transmitting a signal that permits the second distant device to transmit data to the communication apparatus,
    wherein when the concurrent communication with the first distant device and the second distant device is ended, the communication control unit stops inserting the delay before the signal that permits the second distant device to transmit data to the communication apparatus,
    and wherein when the communication apparatus does not communicate with the first distant device and the second distant device concurrently, the selecting unit selects the first communication unit for communication with all distant devices that is capable of communicating via the first communication method.

2. The communication apparatus according to claim 1, wherein when the communication apparatus communicates with the first distant device and the second distant device concurrently, the communication control unit also transmits, in the flow control in communication with the second distant device, a signal that specifies a least value of a number of packets which are permitted to be successively transmitted from the second distant device.

3. The communication apparatus according to claim 2, wherein:
    the flow control is based on a credit, the credit corresponding to the number of packets which are permitted to be successively transmitted from the distant device; and
    when the communication apparatus communicates with the first distant device and the second distant device concurrently, the communication control unit transmits the signal that specifies a first credit having the least value to the second distant device.

4. The communication apparatus according to claim 3, wherein when the concurrent communication with the first distant device and the second distant device is ended, the communication control unit transmits a signal that specifies a second credit having a value larger than the least value to the second distant device for which the first credit had been specified before the concurrent communication has been ended.

5. The communication apparatus according to claim 1, wherein the first type of data is streaming data.

6. The communication apparatus according to claim 1, wherein:
    the communication apparatus is capable of being connected to a piconet including:
        a first communication apparatus functioning as a master that manages a timing in communication; and
        a second communication apparatus communicating with the master as a slave; and
    the first distant device and the second distant device belong to different piconets.

7. The communication apparatus according to claim 1, wherein the communication apparatus is incorporated in an electronic device mounted in a vehicle, and communicates with the distant device incorporated in a mobile device carried in the vehicle.

8. The communication apparatus according to claim 1, wherein:
    the first communication method is a communication method based on Bluetooth (BR/EDR); and
    the second communication method is a communication method based on Bluetooth+HS that uses a wireless LAN.

9. A communication apparatus capable of concurrently communicating with a plurality of distant devices, the apparatus comprising:
    a first communication unit that communicates in a first communication method having a first communication speed;
    a second communication unit that communicates in a second communication method having a second communication speed higher than the first communication speed and consuming more power than the first communication method;
    a communication control unit that performs flow control in communication with the plurality of distant devices, the flow control being based on a credit corresponding to a number of packets which are permitted to be successively transmitted from the distant device; and a selecting unit that selects, for each of the plurality of distant devices, one of the first and second communication units as a communication unit to be used for communication therewith, wherein the plurality of distant devices include:
at least one first distant device that communicates a first type of data which requires to suppress a change in a data transfer rate; and
at least one second distant device that communicates a second type of data which permits a change in a data transfer rate, wherein when the communication apparatus concurrently communicates with the at least one first distant device and the at least one second distant device, the selecting unit selects the first communication unit for communication with the first distant device and selects the second communication unit for communication with the second distant device, and the communication control unit transmits to the second distant device, in the flow control in communication with the second distant device, a signal that specifies a first credit having a least value of a number of packets which are permitted to be successively transmitted from the second distant device, and wherein when the communication apparatus does not communicate with the first distant device and the second distant device concurrently, the selecting unit selects the first communication unit for communication with all distant devices that is capable of communicating via the first communication method.

10. The communication apparatus according to claim 9, wherein when the concurrent communication with the first distant device and the second distant device is ended, the communication control unit transmits a signal that specifies a second credit having a value larger than the least value to the second distant device for which the first credit had been specified before the concurrent communication has been ended.

11. The communication apparatus according to claim 9, wherein the first type of data is streaming data.

12. The communication apparatus according to claim 9, wherein:
the communication apparatus is capable of being connected to a piconet including:
a first communication apparatus functioning as a master that manages a timing in communication; and
a second communication apparatus communicating with the master as a slave; and
the first distant device and the second distant device belong to different piconets.

13. The communication apparatus according to claim 9, wherein the communication apparatus is incorporated in an electronic device mounted in a vehicle, and communicates with the distant device incorporated in a mobile device carried in the vehicle.

14. The communication apparatus according to claim 9, wherein:
the first communication method is a communication method based on Bluetooth (BR/EDR); and
the second communication method is a communication method based on Bluetooth+HS that uses a wireless LAN.

* * * * *